United States Patent [19]
Kobayashi

[11] Patent Number: 5,724,207
[45] Date of Patent: Mar. 3, 1998

[54] CASSETTE HOLDER FOR INDIVIDUALLY HOLDING DIFFERENT SIZE CASSETTES

[75] Inventor: Junji Kobayashi, Tokyo, Japan

[73] Assignee: Canon Kabushiki Kaisha, Tokyo, Japan

[21] Appl. No.: 696,110

[22] Filed: Aug. 13, 1996

Related U.S. Application Data

[63] Continuation of Ser. No. 363,369, Dec. 23, 1994, abandoned.

[30] Foreign Application Priority Data

Dec. 31, 1993 [JP] Japan .................................. 5-352063

[51] Int. Cl.$^6$ .......................... G11B 5/008; G11B 15/00; G11B 17/00
[52] U.S. Cl. .................. 360/96.5; 360/95; 360/94
[58] Field of Search ........................... 360/94, 85, 96.5, 360/132, 95

[56] References Cited

U.S. PATENT DOCUMENTS

| 5,289,324 | 2/1994 | Katoku et al. | 360/96.5 |
| 5,386,329 | 1/1995 | Ikegawa | 360/95 |
| 5,602,695 | 2/1997 | Nishijima et al. | 360/94 |

*Primary Examiner*—Stuart S. Levy
*Assistant Examiner*—Adriana Giordana
*Attorney, Agent, or Firm*—Robin, Blecker, Daley and Driscoll

[57] ABSTRACT

In a cassette holder having, on the lower side thereof, a lid unlocking member arranged to unlock the lid of a cassette when the cassette is inserted and a stopper member arranged to stop the cassette by abutting on the front surface of the cassette, the lid unlocking member and the stopper member or at least the lid unlocking member is carried by the support member together with a protruding part which protrudes inward from the inner side of the cassette holder. The support member is arranged on the lower side of the cassette holder to face the inside of the cassette holder.

12 Claims, 7 Drawing Sheets

1

CASSETTE HOLDER FOR INDIVIDUALLY HOLDING DIFFERENT SIZE CASSETTES

This is a continuation application under 37 CFR 1.62 of prior application Ser. No. 08/363,369 filed on Dec. 23, 1994 (abandoned).

BACKGROUND OF THE INVENTION

1. Field of the Invention

This invention relates to a cassette holder device adapted for a recording or a reproducing apparatus such as a VTR and arranged to permit selective use of a plurality of cassettes of different sizes.

2. Description of the Related Art

The conventional cassette holder device of the kind permitting selective insertion of a plurality of cassettes of different sizes has been arranged, for example, as shown in FIG. 1 which shows an applicable part of an apparatus. The device includes lid unlocking parts 100a and 100b which are arranged to unlock a lock 103a of a cassette lid when a cassette 103 is inserted into the cassette holder device. Stopper parts 101a and 101b are arranged to bring the cassette 103 to a stop by abutting on a front impinging part of the cassette 103. These parts are secured to the lower surface of a cassette holder 102 and are respectively arranged in pairs.

In inserting a large cassette 103, for example, the lid unlocking part 100b and the stopper part 101b which are respectively provided for a small cassette are prevented from abutting the large cassette 103 by means of a cutout groove 104 and a cutout part 105 provided in the bottom side and the lid of the large cassette 103.

The inclusion of the cutout groove 104, however, has caused the thickness of the whole bottom side of the cassette 103 to be increased as indicated by a reference symbol t in FIG. 1. The thick bottom side has increased the thickness of the cassette 103. As a result, it has been necessary to increase the thickness of the cassette holder 102 accordingly. This has presented a problem.

SUMMARY OF THE INVENTION

This invention is directed to the solution of the above-stated problem of the prior art. It is therefore an object of this invention to provide either a cassette holder arranged to obviate the necessity of forming any cutout groove and any cutout part in the large cassette for escaping the lid unlocking member and the stopper member provided for the small cassette or a recording or reproducing apparatus which includes the cassette holder arranged as described above.

It is another object of this invention to provide a cassette holder which is arranged to permit reduction in thickness thereof or a recording or reproducing apparatus which includes the cassette holder.

To attain the above-stated object, a cassette holder which is arranged according to this invention as an embodiment thereof is provided with: a housing arranged to have a cassette inserted therein; an unlocking member arranged to be capable of unlocking the lid of the cassette; a stopper arranged to stop the cassette by abutting on the front surface of the cassette; and a support member including the unlocking member and a protruding part, the unlocking member and the protruding part being mounted on the housing in such a way as to protrude inward from the inner side of the housing.

To attain the object from a different viewpoint, a recording or reproducing apparatus is provided with: recording or reproducing means arranged to be capable of recording or reproducing information on or from a recording medium stowed within a cassette; and a cassette holder including a housing which is arranged to have the cassette inserted therein, an unlocking member arranged to be capable of unlocking the lid of the cassette, a stopper arranged to bring the cassette to a stop by abutting on the front surface of the cassette and a support member having the unlocking member and a protruding part included therein and mounted on the housing in such a way as to protrude inward from the inner side of the housing.

The above and other objects and features of this invention will become apparent from the following detailed description of an embodiment thereof taken in connection with the accompanying drawings.

DETAILED DESCRIPTION OF PREFERRED EMBODIMENTS

The arrangement of a preferred embodiment of this invention is described with reference to the drawings as follows: In the case of the embodiment, this invention is applied to a magnetic recording and/or reproducing apparatus of the kind arranged to record and/or reproduce information on or from a magnetic recording tape with a head which is mounted on a rotary drum.

Figure 2:
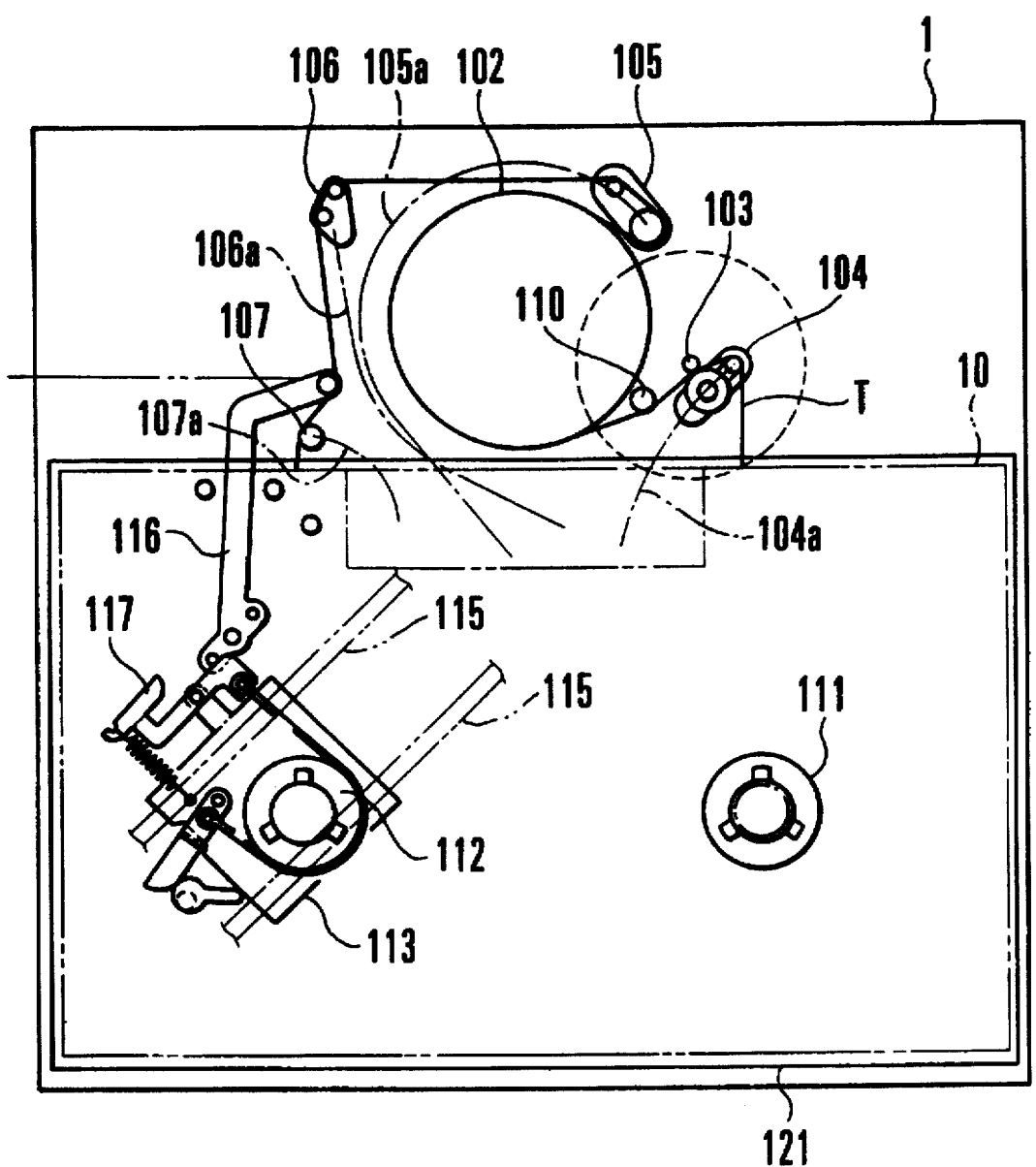
FIG. 2 shows in outline the arrangement of a magnetic recording and/or reproducing apparatus arranged according to this invention, the apparatus being shown as in a state of having been loaded with a large cassette.

FIG. 2 shows in outline the arrangement of the magnetic recording and/or reproducing apparatus. The illustration includes a chassis 1, a rotary drum 102 which is placed on the chassis 1, a capstan 103, a pinch skate 104 on which a pinch roller is placed, a leading skate 105, a trailing skate 106 and a cassette post 107. The pinch skate 104, the leading skate 105, the trailing skate 106 and the cassette post 107 are arranged to be movable along their respective paths 104a, 105a, 106a and 107a so that, as shown in FIG. 2, a tape T which is pulled out from a large cassette 10 mounted on the chassis 1 is wrapped around the rotary drum 102 and a post 110 disposed on an exit side.

Figure 3:
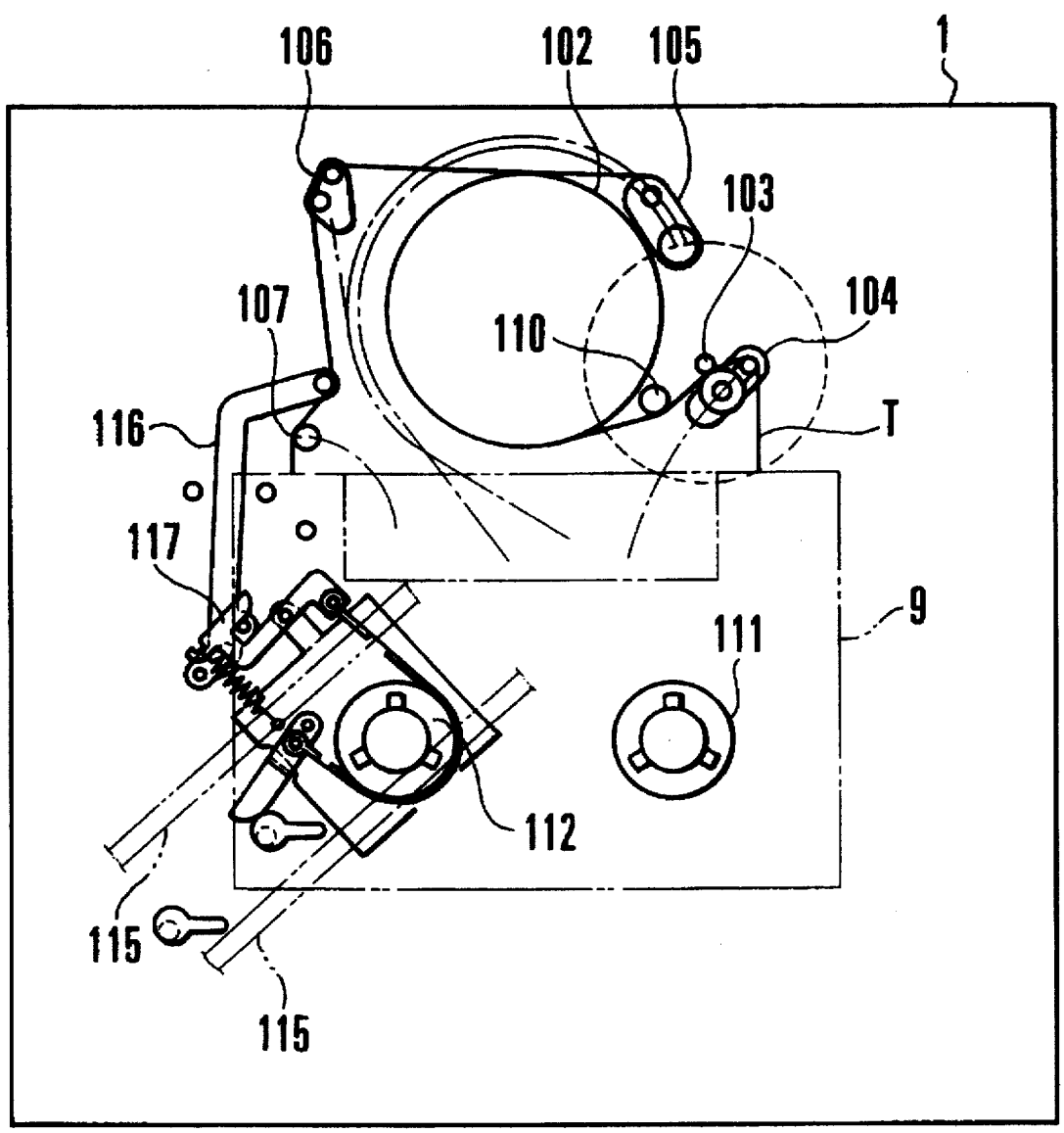
FIG. 3 shows the apparatus shown in FIG. 2 as in a state of being loaded with a small cassette.

A take-up reel mount 111 is placed on a take-up reel mount base which is not shown. A supply reel mount 112 is placed on a supply reel mount base 113. Referring to FIG. 3, the take-up reel mount base and the supply reel mount base 113 are movable along rails 115 for a small cassette 9 when the small cassette 9 is mounted on the chassis 1. The large cassette 10 which is shown in FIG. 2 and the small cassette 9 which is shown in FIG. 3 thus can be set in their respective predetermined positions.

The cassette 10 or 9 is inserted and held within a cassette holder 121 when the cassette holder 121 is in a raised position. When the cassette holder 121 descends, the cassette 10 or 9 is mounted on the reel mounts 111 and 112. While the cassette holder 121 is descending, the lid of the cassette 10 or 9 is opened.

The cassette holder 121 of this embodiment is described with reference to FIGS. 4 to 7 as follows.

Figure 4:
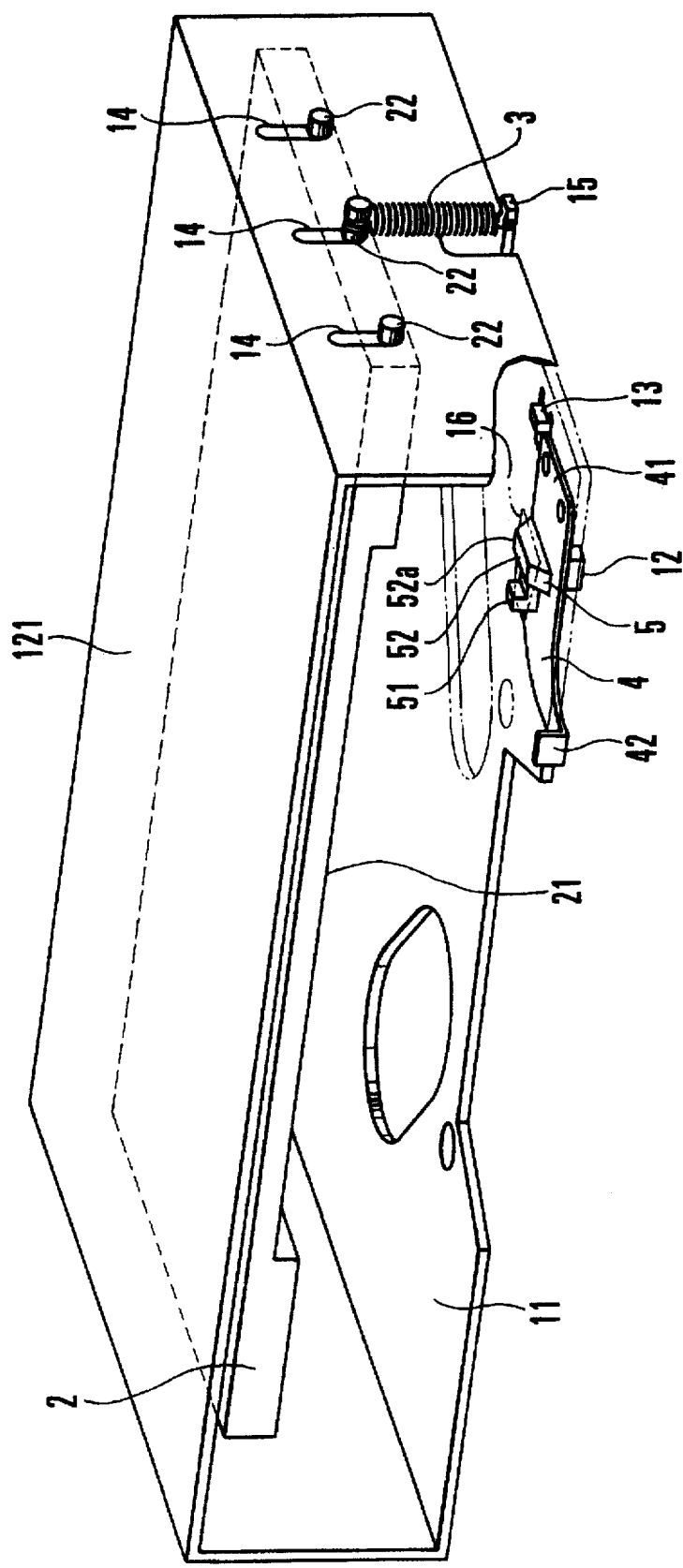
FIG. 4 is an oblique view showing a cassette holder arranged in the same embodiment.

Referring to FIG. 4, the cassette holder 121 is carried on the chassis 1 by holder moving means which is not shown. The bottom plate 11 of the cassette holder 121 is provided with a stopper part 12 and a lid unlocking part 13 which are respectively formed in a bent-up manner. The stopper part 12 and the lid unlocking part 13 are in positions where they respectively can abut on a front impinging part of the large cassette 10 and a lid locking member. A cassette retaining member 2 has a groove part 21 which extends to a length approximately corresponding to the width of the small cassette 9. Three shafts 22 are erected on each of the right and left side faces of the cassette retaining member 2. These shafts 22 engage slots 14 formed in the two sides of the cassette holder 121 and are movable up and down within the slots 14. A spring 3 is arranged between a spring locking part 15 and one of the shafts 22 to urge the cassette retaining member 2 to move downward. For a smooth movement of the cassette retaining member 2, the spring 3 is preferably arranged in this manner on each of the right and left sides of the cassette retaining member 2.

A member 4 which represents a feature of this embodiment is composed of an elastic leaf spring and is connected by caulking to the reverse side of the bottom plate 11 of the cassette holder 1 at its end part 41. The fore end of the leaf spring member 4 is bent up to form a stopper part 42, which is located on the same plane as the stopper part 12 and is in a position to abut on the front impinging part of the small cassette 9. An abutting member 5 is welded to the middle part of the leaf spring member 4 and is formed in one unified body with the latter. The abutting member 5 includes a lid unlocking part 51 for the small cassette 9 and a protruding part 52 arranged to abut on the large cassette 10. When the leaf spring member 4 is in a no-load state, the lid unlocking part 51 and the protruding part 52 protrude inward from an opening part 16 provided in the bottom plate 11 of the cassette holder 121.

Figure 5:
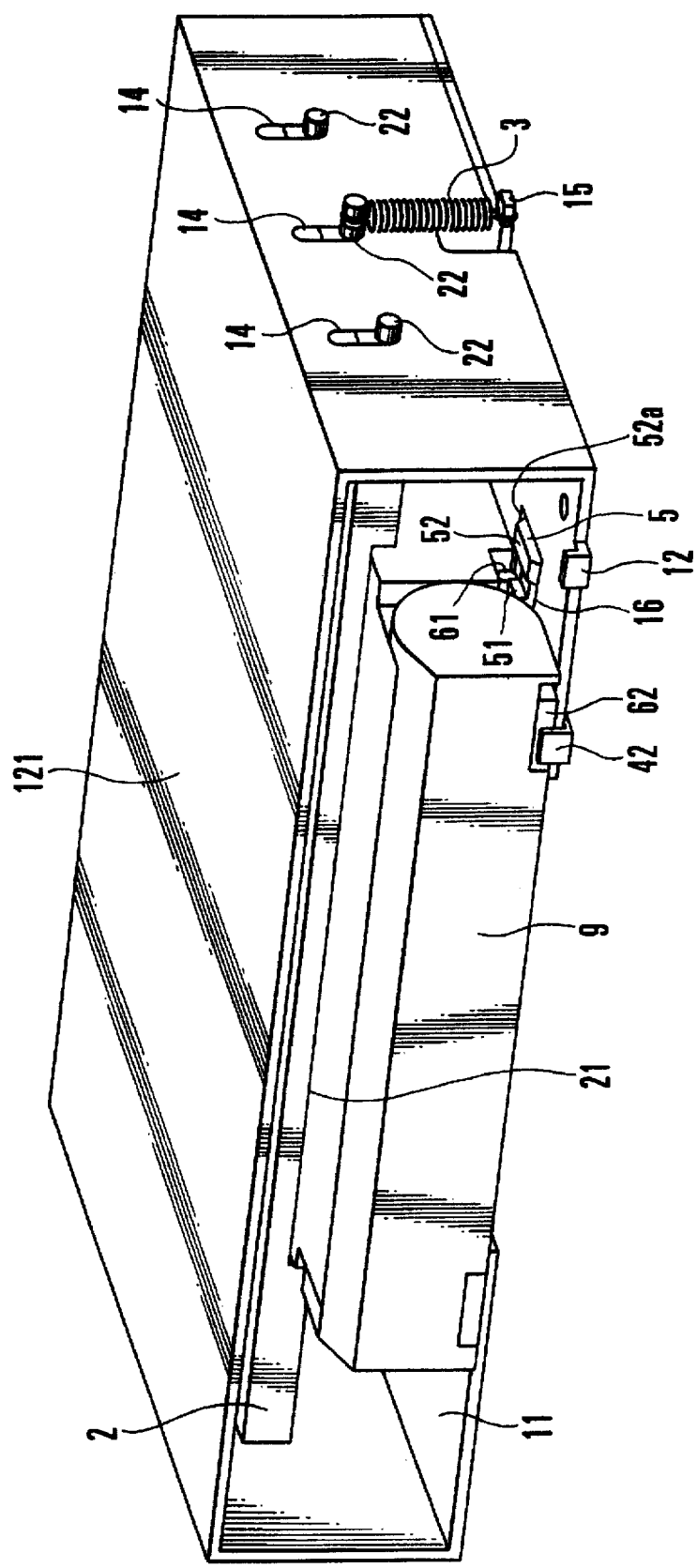
FIG. 5 is an oblique view showing the cassette holder of the same embodiment as in a state of having been completely loaded with a small cassette.

With the embodiment arranged as described above, when the small cassette 9 is inserted into the cassette holder 121 along the groove part 21 of the cassette retaining member 2, the small cassette 9 moves forward in a state of being pushed against the bottom plate 11 of the cassette holder 121 by the cassette retaining member 2 under the force of the spring 3, as shown in FIG. 5. The lid unlocking part 51 of the abutting member 5 comes to unlock the lid by abutting on the lid locking member 61 of the small cassette 9. The stopper part 42 of the leaf spring member 4 then comes to abut on the front impinging part 62 of the small cassette 9 to stop the small cassette 9 from moving.

Figure 6:
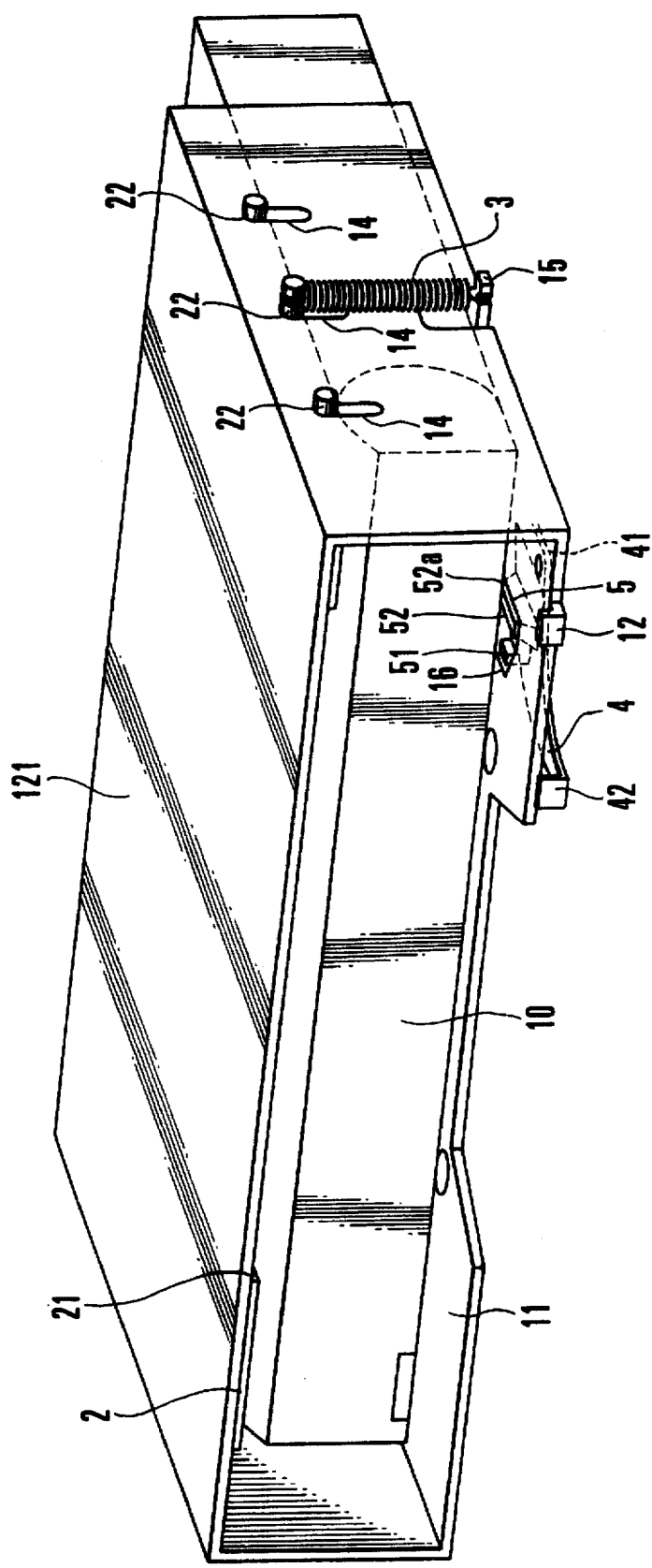
FIG. 6 is an oblique view showing the cassette holder of the same embodiment as in process of being loaded with a large cassette.

In case where the large cassette 10 is inserted into the cassette holder 121 as shown in FIG. 6, on the other hand, the large cassette 10 moves forward in a state of being pushed by the cassette retaining member 2 against the bottom plate 11 of the cassette holder 121 under the force of the spring 3. The lower edge of the front side of the large cassette 10 comes to abut on a rear slanting face 52a of the protruding part 52 of the abutting member 5. As a result, the left part of the leaf spring member 4 is pushed downward to cause the fore end of the lid unlocking part 51 and that of the stopper part 42 to sink from the inner side of the bottom plate 11 of the cassette holder 121 to their positions as shown in FIG. 6.

Figure 7:
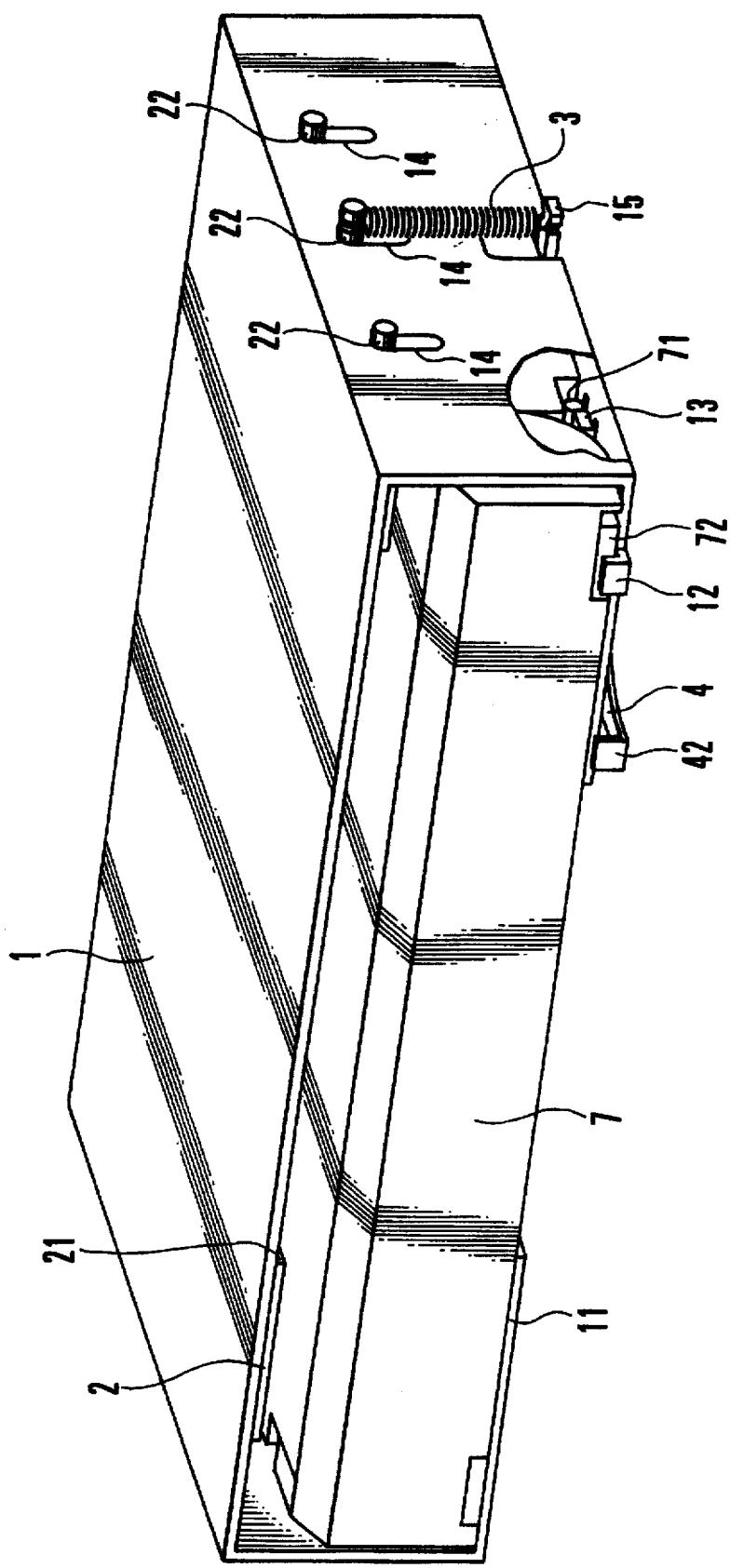
FIG. 7 is an oblique view showing the cassette holder of the same embodiment as in a state of having been completely loaded with a large cassette.

After that, the large cassette 10 further moves. Then, as shown in FIG. 7, the lid unlocking part 13 of the cassette holder 121 abuts on the lid locking member 71 of the large cassette 10 to unlock the lid of the large cassette 10. The stopper part 12 abuts on the front impinging part 72 of the large cassette 10 to stop the large cassette 10 from moving.

Figure 1:
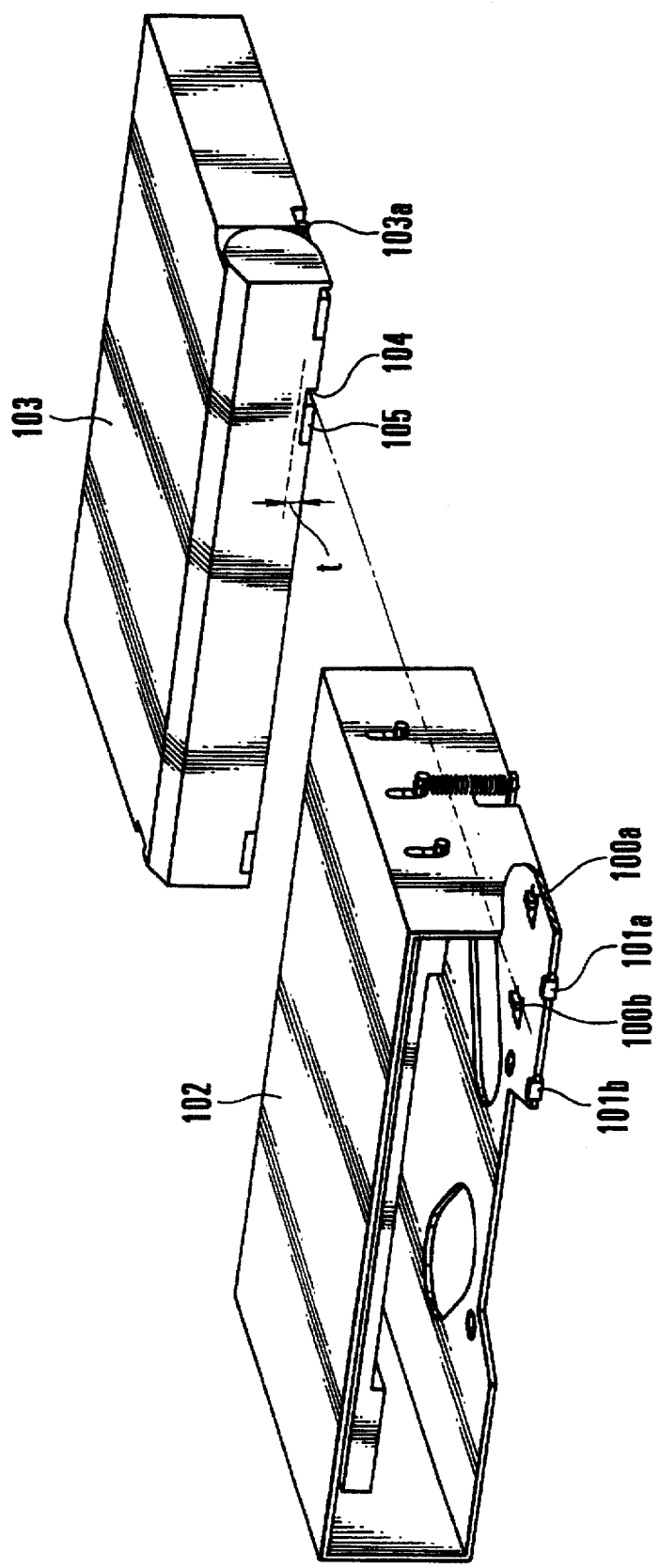
FIG. 1 is an oblique view showing the conventional cassette holder and a large cassette.

When the large cassette 10 is inserted in this manner, the lid unlocking part 51 which is provided for the small cassette 9 escapes the large cassette 10 in the manner mentioned above. This arrangement obviates the necessity of providing the large cassette 10 with the escaping cutout groove 104 in its bottom side as shown in FIG. 1. Further, since this embodiment is arranged to cause both the lid unlocking part 51 and the stopper part 42 to escape the large cassette 10, the large cassette 10 does not have to be provided with the escaping cutout part 105 (FIG. 1) in its lid for the front impinging part.

As described in the foregoing, in accordance with the arrangement of this embodiment, the lid unlocking member and the stopper member or at least the lid unlocking member is formed in one body with the protruding part which protrudes into the inside of the cassette holder. These parts are arranged on the lower side of the cassette holder in a state of being urged toward the inside of the cassette holder. The embodiment is thus arranged in a simple manner to obviates the necessity for the provision of the cutout groove and the cutout part in the large cassette for escapement. In accordance with the invented arrangement, therefore, the thickness of the cassette can be reduced and that of the cassette holder also can be reduced accordingly.

This invention is not limited to the embodiment described. Various modifications of the embodiment described and different applications of the invention are possible on the basis of the technological concept of this invention. For example, the leaf spring member of the embodiment may be replaced with a combination of a rigid member and a spring.

What is claimed is:

1. A recording and/or reproducing apparatus comprising:
   a) recording and/or reproducing means arranged to be capable of recording and/or reproducing information on or from a recording medium stowed within a cassette; and
   b) a cassette holder for insertable receipt individually of first and second cassettes having respective different dimensions in a direction transverse to a cassette insertion direction, said cassette holder comprising:
   a housing adapted to have an individual cassette inserted therein;
   first and second unlocking means for respective unlocking of a lid of said first and second cassettes inserted in said housing, said first and second unlocking means being disposed in respective first and second different positions transversely of said cassette insertion direction; and
   displacement means for displacing said first unlocking means from an interfering relation with an inserted said second cassette and into an inoperative state; said displacement means including a support member having one end immovably attached to said housing, said support member including said first unlocking means and an upstanding member;

said one end of said support member, said upstanding member and said first unlocking means all being aligned in said direction transverse to said cassette insertion direction, and said first unlocking means being more apart from said one end of said support member than the upstanding member.

2. A cassette holder according to claim 1, wherein said support member is supported in a cantilever fashion on said housing.

3. A cassette holder according to claim 1, wherein said upstanding member is disposed in an interference path with said inserted second cassette.

4. A cassette holder according to claim 1, wherein said upstanding member defines a surface that is inclined relative to a plane defined by said cassette insertion direction and said transverse direction.

5. A cassette holder according to claim 1, further including first and second stop means respectively for stopping insertion of said first and second cassettes, said first and second stop means being disposed in respective different positions transversely of said cassette insertion direction.

6. A cassette holder according to claim 1, wherein said support member supports said first stop means.

7. A cassette holder for insertable receipt individually of first and second cassettes having respective different dimensions in a direction transverse to a cassette insertion direction, said cassette holder comprising:

a) a housing adapted to have an individual cassette inserted therein;

b) first and second unlocking means for respective unlocking of a lid of said first and second cassettes inserted in said housing, said first and second unlocking means being disposed in respective first and second different positions transversely of said cassette insertion direction; and c) displacement means for displacing said first unlocking means from an interfering relation with an inserted said second cassette and into an inoperative state; said displacement means including a support member having one end immovably attached to said housing, said support member including said first unlocking means and an upstanding member;

said one end of said support member, said upstanding member and said first unlocking means all being aligned in said direction transverse to said cassette insertion direction, and said first unlocking means being more apart from said one end of said support member than the upstanding member.

8. A cassette holder according to claim 7, wherein said support member is supported in a cantilever fashion on said housing.

9. A cassette holder according to claim 8, wherein said upstanding member is disposed in an interference path with said inserted second cassette.

10. A cassette holder according to claim 9, wherein said upstanding member defines a surface that is inclined relative to a plane defined by said cassette insertion direction and said transverse direction.

11. A cassette holder according to claim 7, further including first and second stop means respectively for stopping insertion of said first and second cassettes, said first and second stop means being disposed in respective different positions transversely of said cassette insertion direction.

12. A cassette holder according to claim 11, wherein said support member supports said first stop means.

* * * * *

UNITED STATES PATENT AND TRADEMARK OFFICE
CERTIFICATE OF CORRECTION

PATENT NO. : 5,724,207
DATED : March 3, 1998
INVENTOR(S) : Kobayashi, Junji

It is certified that error appears in the above-identified patent and that said Letters Patent is hereby corrected as shown below:

Col. 2, line 43, delete "follows:" and insert -- follows. --.

Signed and Sealed this

Twenty-fifth Day of August, 1998

Attest:

BRUCE LEHMAN

Attesting Officer

Commissioner of Patents and Trademarks